(12) United States Patent
Muramatsu et al.

(10) Patent No.: US 9,443,313 B2
(45) Date of Patent: Sep. 13, 2016

(54) STEREO CAMERA APPARATUS

(71) Applicant: Hitachi Automotive Systems, Ltd., Hitachinaka-shi, Ibaraki (JP)

(72) Inventors: Shoji Muramatsu, Hitachinaka (JP); Mirai Higuchi, Mito (JP); Tatsuhiko Monji, Hitachinaka (JP); Soichiro Yokota, Tokyo (JP); Morihiko Sakano, Hitachinaka (JP); Takeshi Shima, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/692,276

(22) Filed: Apr. 21, 2015

(65) Prior Publication Data

US 2015/0339825 A1   Nov. 26, 2015

Related U.S. Application Data

(63) Continuation of application No. 13/577,712, filed as application No. PCT/JP2010/063755 on Aug. 13, 2010, now abandoned.

(30) Foreign Application Priority Data

Mar. 12, 2010   (JP) ................................. 2010-056199

(51) Int. Cl.
*G06T 7/00* (2006.01)
*G01C 3/06* (2006.01)
(Continued)

(52) U.S. Cl.
CPC ............... *G06T 7/0075* (2013.01); *G01C 3/06* (2013.01); *G06K 9/00805* (2013.01); *G08G 1/166* (2013.01); *G06T 2207/10012* (2013.01); *G06T 2207/20012* (2013.01); *G06T 2207/30261* (2013.01)

(58) Field of Classification Search
None
See application file for complete search history.

(56) References Cited

U.S. PATENT DOCUMENTS 8,090,193 B2   1/2012   Higaki et al.
2006/0221250 A1   10/2006   Rossbach et al.
(Continued)

FOREIGN PATENT DOCUMENTS

| EP | 2 071 491 A1 | 6/2009 |
| JP | 9-133524 A | 5/1997 |
| JP | 2001-266128 A | 9/2001 |

(Continued)

OTHER PUBLICATIONS

International Search Report including English language translation dated Nov. 2, 2010 (Six (6) pages).
(Continued)

*Primary Examiner* — Michael Teitelbaum
(74) *Attorney, Agent, or Firm* — Crowell & Moring LLP

(57) ABSTRACT

A stereo camera apparatus which carries out distance measuring stably and with high accuracy by making measuring distance resolution variable according to a distance to an object is provided. A stereo camera apparatus 1 takes in two images, changes resolution of a partial area of each image that is taken in, and calculates a distance from a vehicle to an object that is imaged in the partial area, based on disparity of the partial area of each image in which resolution is changed. Thus, even when the object exists at a long distance and is small in size, distance measuring processing can be carried out stably.

2 Claims, 20 Drawing Sheets

(51) Int. Cl.
*G08G 1/16* (2006.01)
*G06K 9/00* (2006.01)

(56) References Cited

U.S. PATENT DOCUMENTS

| | | |
|---|---|---|
| 2009/0153664 A1 | 6/2009 | Higuchi et al. |
| 2012/0078684 A1 | 3/2012 | MacIocci et al. |

FOREIGN PATENT DOCUMENTS

| | | |
|---|---|---|
| JP | 2004-245701 A | 9/2004 |
| JP | 2006-38578 A | 2/2006 |
| JP | 2006-318272 A | 11/2006 |
| JP | 2008-39491 A | 2/2008 |
| JP | 2008-90583 A | 4/2008 |
| JP | 2008-298532 A | 12/2008 |
| JP | 2008-298533 A | 12/2008 |
| JP | 2009-136968 A | 6/2009 |
| JP | 2009-146217 A | 7/2009 |
| JP | 2010-21730 A | 1/2010 |

OTHER PUBLICATIONS

European Written Opinion dated Apr. 7, 2014 (Eight (8) pages).

PRIORITY ORDER DETERMINATION TABLE

| | PRECEDING CAR | ONCOMING CAR | STILL OBJECT | SIGN |
|---|---|---|---|---|
| COLLISION WARNING | 3 | 1 | 2 | 4 |
| COLLISION MITIGATION CONTROL | 3 | 1 | 2 | 4 |
| SPEED LIMIT CONTROL | 2 | 2 | 2 | 1 |
| FOLLOWING DISTANCE KEEPING | 1 | 4 | 2 | 3 |

2000: HIGH-RESOLUTION IMAGE

2001: IMAGE USED FOR PROCESSING

2100: HIGH-RESOLUTION IMAGE

2102

2101: LOW-RESOLUTION IMAGE

STEREO CAMERA APPARATUS

CROSS-REFERENCE TO RELATED APPLICATION

This application is a continuation of U.S. application Ser. No. 13/577,712, filed, Aug. 8, 2012, which is a National Stage application of PCT International Application No. PCT/JP2010/063755, filed Aug. 13, 2010, which claims priority under 35 U.S.C. §119 to Japanese Patent Application No. 2010-056199, filed Mar. 12, 2010, the disclosures of which are expressly incorporated by reference herein.

TECHNICAL FIELD

The present invention relates to a stereo camera apparatus installed in a vehicle and relates to, for example, a stereo camera apparatus which measures the distance from the vehicle to an object in front of the vehicle with high accuracy.

BACKGROUND ART

A stereo camera apparatus which measures the distance to an object based on the principle of triangulation using two cameras is known. For example, by installing a stereo camera apparatus in an automobile and thus extracting an obstacle in front or white lines on the road and calculating the distance to the obstacle or the shape of the road on which the automobile is traveling, it becomes possible to notify the driver of a danger and secure safe driving.

Since each camera is installed on the vehicle so that the camera is parallel to the road surface, distance resolution is lower for a distant place than for neighborhood. Also, since an object in a distant place appears small on an image, it is difficult to measure the distance to the object, stably. Thus, with the stereo camera apparatus, improving stability and accuracy of distance measuring for distance places is an important task.

The stereo camera analyzes images acquired from left and right cameras and calculates disparity of an object, based on the principle of triangulation, and converts the value thereof into distance data. As a disparity calculation method, a method where small areas (matching blocks) are set based on the image on the right side of the two images, as a standard image, and a reference image on the left side is searched for a small area having a high correlation value (degree of similarity), is used. For calculation of the correlation value between matching blocks, for example, there is a SAD (sum of absolute differences) method or the like.

In the technique disclosed in PTL 1, for the purpose of improving the resolution of the stereo camera apparatus, in the setting of matching blocks, disparity is calculated with neighboring blocks overlapping each other in left-right direction, whereas normally division is carried out on a block basis in order to reduce computational complexity. Thus, high accuracy and stable disparity calculation are realized.

Also, PTL 2 discloses a technique where, when a predetermined correlation value is not obtained in the search of a first matching block that is set first in a standard image and a reference image, the size of matching blocks is changed and then search is carried out again, for the purpose of increasing accuracy at corresponding points.
PTL 1: JP-A-9-133524
PTL 2: JP-A-2008-90583

DISCLOSURE OF THE INVENTION

Technical Problem

However, in the case of the method disclosed in PTL 1, though stability of measuring is improved by finely shifting and setting the position of matching blocks by half a block on the standard image, improvement in distance resolution for distant places is insufficient. For example, when the input image shown in FIG. 3(a) is used directly for disparity calculation, distance resolution itself does not change even if the position of matching blocks is finely shifted, as shown in FIG. 3(b). Also, FIGS. 3(a) and 3(b) are views schematically showing a picked-up image of a road where white lines are drawn on both sides in a direction of vehicle width.

Moreover, concerning the technique of PTL 2, if a predetermined correlation value is not obtained in the first round, the size of matching blocks is changed and calculation of correlation value is carried out again, thereby realizing more stable disparity calculation. This is because, for example, as shown in FIGS. 4(a) and 4(b), when an object (preceding car) 410 is at a short distance, a correlation value can be calculated sufficiently correctly with a large matching block 400 as shown in FIG. 4(a), but when the object is at a long distance as shown in FIG. 4(b), unless a matching block 401 is made smaller, the background or the like enters the matching block, making it difficult to find a correlation value accurately.

However, the technique of PTL 2, too, uses the input image directly for disparity calculation and does not disclose an effective method for improvement in distance resolution. In order to improve distance resolution for distant places with these related-art techniques, for example, application of sub-pixel processing or the like in disparity calculation can be considered.

However, if the same processing is uniformly applied to an entire screen in order to improve distance resolution for distant places, the processing to improve resolution is added also to an object at a short distance, for which improvement in distance resolution is not required originally, and therefore computational complexity increases excessively.

The invention provides a stereo camera apparatus which measures a distance stably and with high accuracy, by varying distance resolution in measuring according to the distance of an object.

Solution to Problem

A stereo camera apparatus according to the invention to solve the above problems takes in two images, changes resolution of a partial area of each image that is taken in, and calculates a distance from a vehicle to an object that is imaged in the partial area, based on disparity of the partial area of each image that is changed.

Advantages Effects of Invention

According to the invention, even when an object exists at a long distance and is small in size, distance measuring processing can be carried out stably.

The specification includes the contents described in the specification and/or drawings of Japanese Patent Application No. 2010-56199, on which this application is based for priority.

BRIEF DESCRIPTION OF DRAWINGS

FIG. 19 is a view illustrating resolution increasing processing in the case where a high-definition image is taken in.

Figure 1:
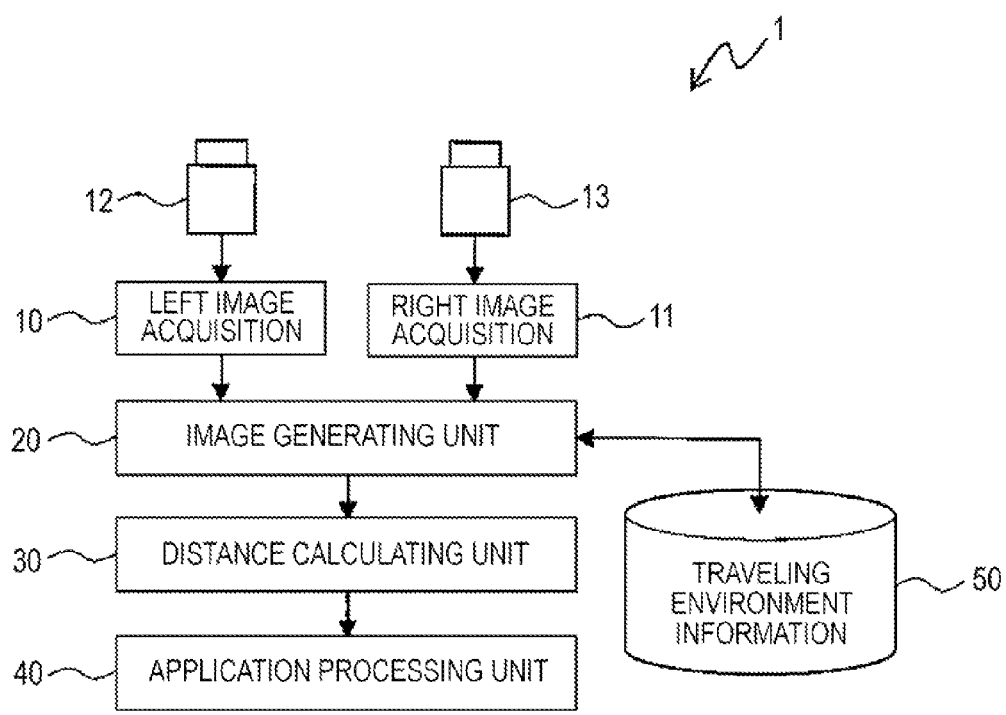
FIG. 1 is a view illustrating the configuration of a stereo camera apparatus according to this embodiment.

REFERENCE SIGNS LIST 1 stereo camera apparatus
10 left image acquiring unit (image capture unit)
11 right image acquiring unit (image capture unit)
12 left camera
13 right camera
20 image generating unit
30 distance calculating unit
40 application processing unit
50 traveling environment information storage unit
1711 standard image (right image)
1712 reference image (left image)

DESCRIPTION OF EMBODIMENTS

First Embodiment

Next, a first embodiment of the invention will be described.

FIG. 1 is a view illustrating the configuration of a stereo camera apparatus of this embodiment.

In a stereo camera apparatus 1, synchronized images from a left camera 12 and a right camera 13 are taken in by respective image acquiring units 10, 11. The left and right cameras 12, 13 are attached on the left side and the right side of a front part of a vehicle and are respectively capable of picking up an image of an area ahead of the vehicle.

Normally, there is proper distortion in the cameras. There are various causes of this distortion such as displacement in installing an image pickup device, distortion proper to an attached lens, or shift in the direction of optical axis of the camera. In triangulation by the stereo camera apparatus, in order to accurately find a correlation value between small areas (matching blocks) on the left and right cameras, it is important that the left and right images arrayed exactly parallel to each other.

Therefore, an image generating unit 20 parallels the left and right images and also corrects various distortions to generate images without distortion. At this time, according to the invention, image generation according to a distance is carried out, referring to traveling environment information stored in a traveling environment information storage unit 50, such as external environment information including a preceding car and an obstacle, vehicle speed of the own car, and map information of the surroundings. By the way, an image generating method in the image generating unit 20 will be described later.

A distance calculating unit 30 carries out disparity calculation using the left and right images generated by the image generating unit 20 and measures the distance from the vehicle of the own car to an object. Then, the resulting distance information is used by an application processing unit 40, thus realizing a following distance keeping system and a collision mitigation brake system.

Figure 16:
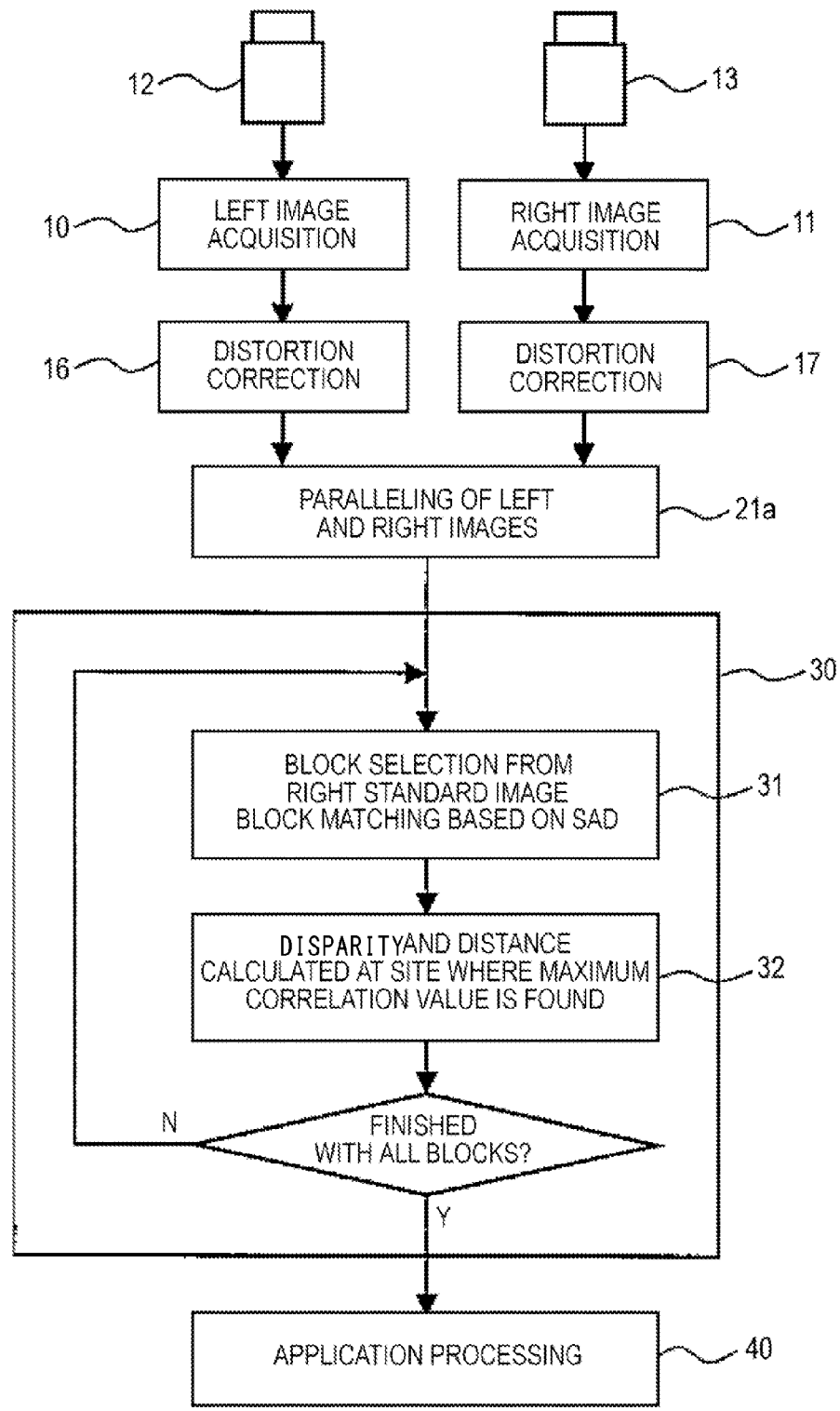
FIG. 16 is a view illustrating a content of the processing carried out in the first embodiment.
Figure 17:
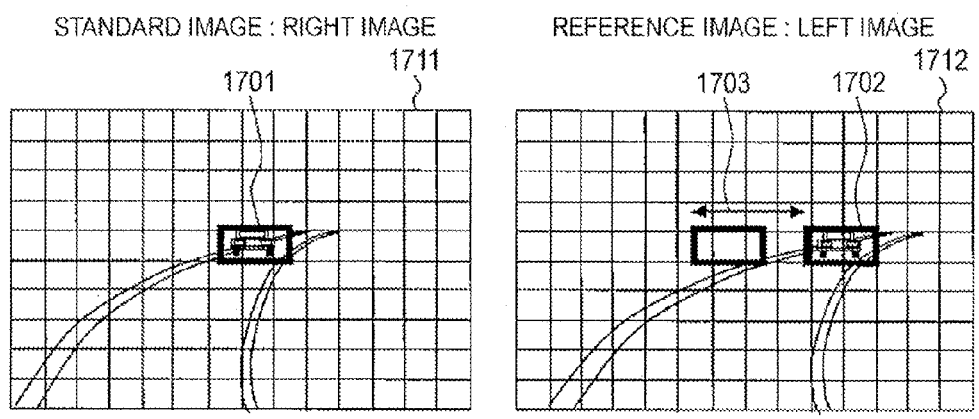
FIGS. 17(a) and 17(b) are views illustrating a processing method for disparity calculation.
Figure 17:
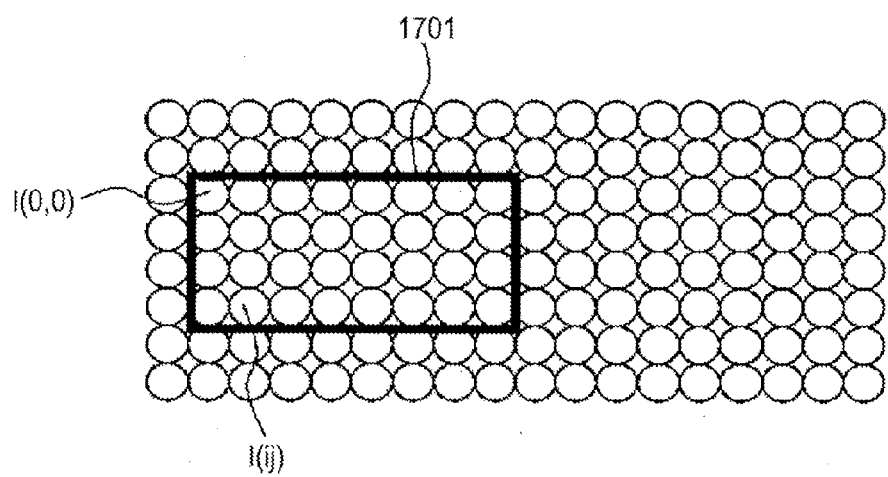

Next, using FIGS. 16 and 17(a) and 17(b), a processing content in the distance calculating unit 30 will be described in detail. An error generated by lens distortion in the cameras 12, 13, attachment error of the image pickup device or the like, in the images taken in by the left and right image acquiring units 10, 11 from the left and right cameras 12, 13, is corrected by distortion correcting units 16, 17.

Then, by an optical axis paralleling means 21a, affine correction is carried out, such as rotating the left and right images so that the optical axes of the left and right cameras 12, 13 become parallel to the images with the distortion eliminated by the correction. Information of distortion and optical axis shift that is necessary for the processing up to this point is investigated and recorded in advance in a non-volatile memory (not shown) inside the stereo camera apparatus 1 at the time of assembly.

Then, distance calculation is carried out by the distance calculating unit 30. The distance calculation is to search for where in the reference image a small area (matching block) of the standard image exists (calculation of corresponding point) and calculate the difference in coordinates on the image as disparity. In FIG. 17(a), using the right image as a standard image 1711 and the left image as a reference image 1712, focus is placed on a matching block 1701 in the standard image 1711.

The matching block 1701 has a matching block size of 8×4 pixels, for example, as shown in FIG. 17(b). The size of the matching block 1701 is desirably a minimum size with which an appropriate correlation value for carrying out matching processing between the left and right images can be found.

Using the matching block 1701 as a template, the reference image 1712 is searched for the same pattern. At this time, since paralleling processing of the left and right images is carried out by the optical axis paralleling means 21a, one-dimensional scan of the reference image 1712 in lateral direction suffices for the search.

For example, one-dimensional scan is carried out from left to right inside the reference image 1712 and a correlation value is calculated. For the calculation of the correlation value, there are many methods such as normalized correlation and phase-only correlation. However, in this embodiment, SAD (summation of absolute difference or sum of absolute differences) is used as an example. A SAD correlation value Cn is calculated by the following equation (1).

[Equation 1]

$$Cn = \Sigma |I(i,j) - R(i+n, j+m)| \quad (1)$$

Here, l(i,j) is a luminance value in a matching block of the standard image 1711 and R(i,j) is a luminance value in a matching block of the reference image. Search is carried out by scanning n, m of the reference image 1712. In this embodiment, since one-dimensional scan is carried out from left to right inside the reference image 1712, m is a fixed value.

Then, as a result of the scan, the results of C0 to CN (N: number of pixels in the search range) are obtained. Therefore, the minimum value thereof is defined as a matching point and disparity information in this case is disparity 1703. As disparity is calculated, the distance to the template object can be calculated from the distance between the left and right cameras and the physical length of disparity, based on the principle of triangulation. These processes are executed in distance calculation 32 of FIG. 16. The processing continues until the processing is finished with all the matching blocks, and distance information is calculated.

Next, an image generating method by the image generating unit 20 will be described.

Figure 2:
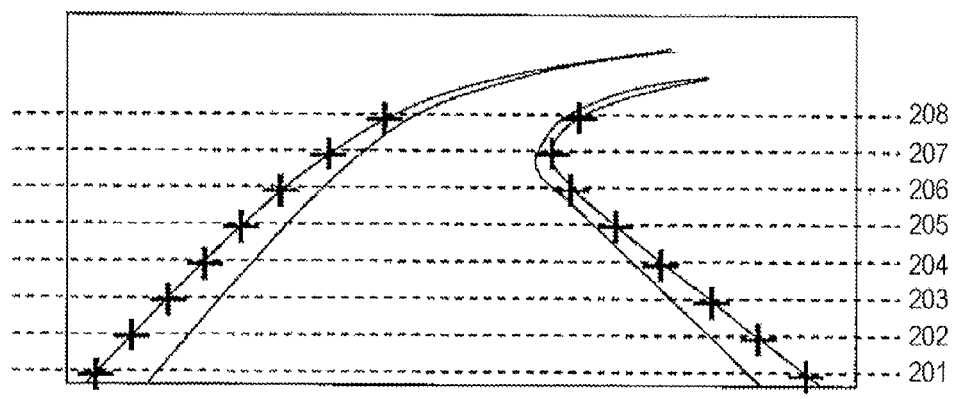
FIGS. 2(a) and 2(b) are views illustrating a lowering of distance resolution for long distances.
Figure 2:
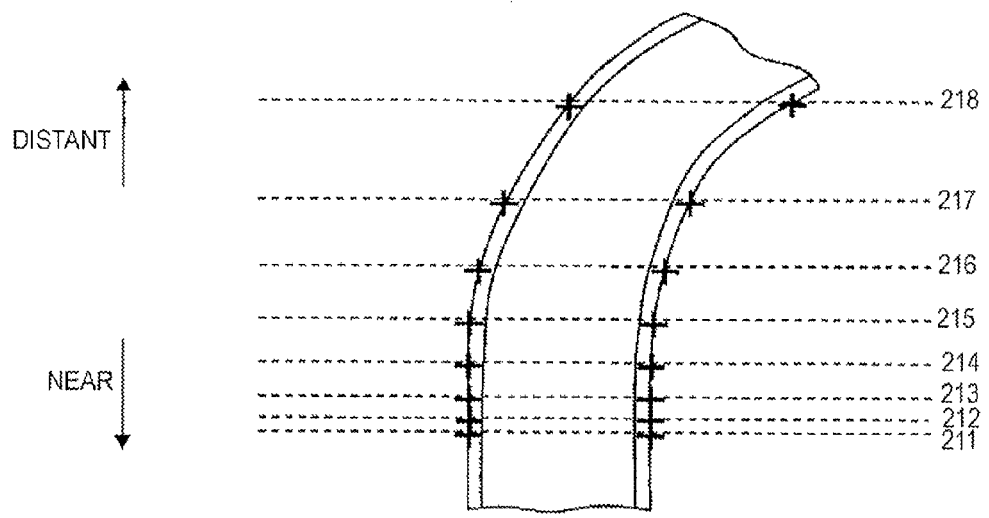
Figure 3:
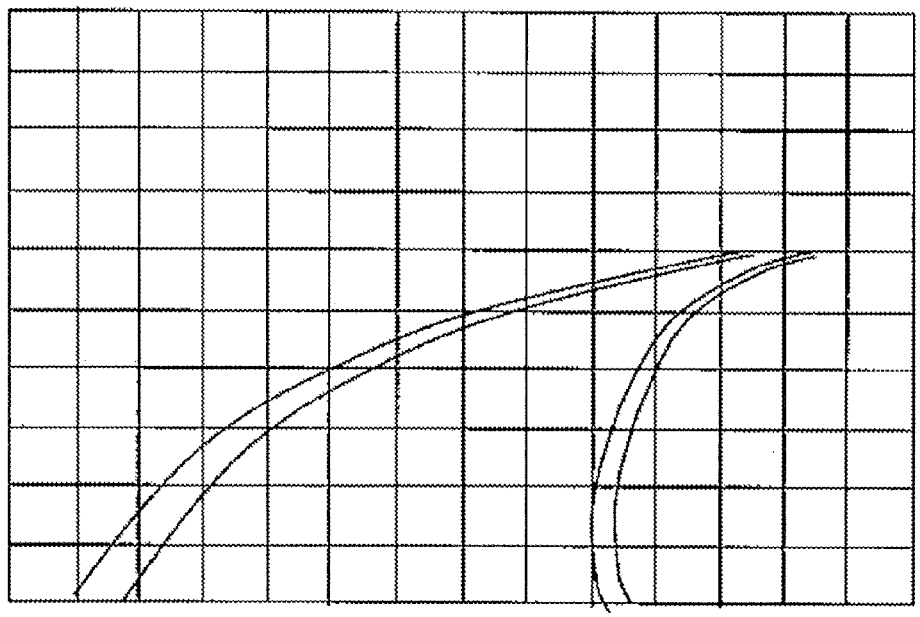
FIGS. 3(a) and 3(b) are views illustrating a first known example.
Figure 3:
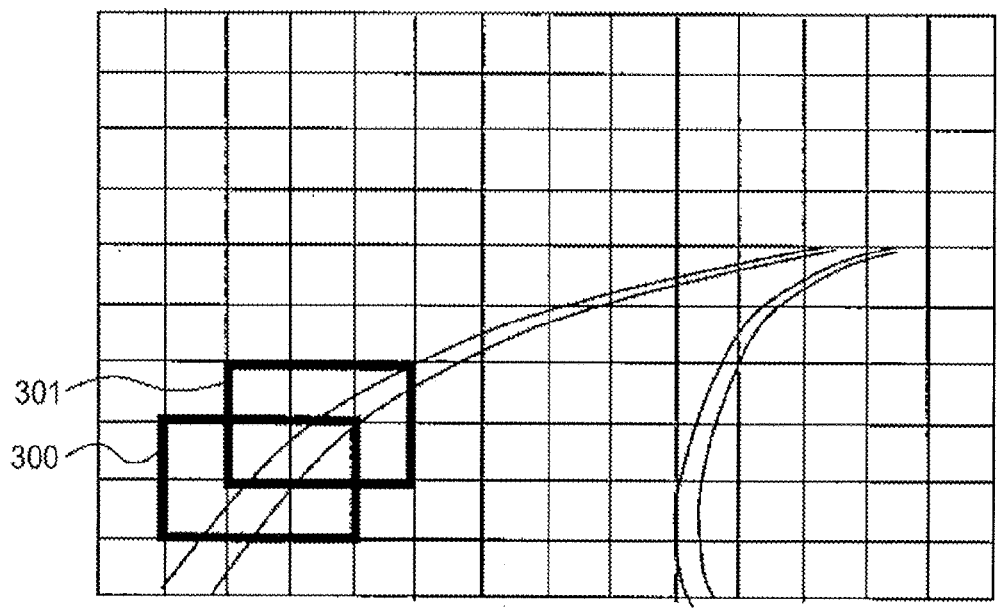

In the image generating unit 20, processing to change the resolution of a partial area of the images inputted from the left and right cameras 12, 13, based on the information of the traveling environment information storage unit 50 of FIG. 1, is carried out. Since the left and right cameras 12, 13 installed in the vehicle are attached substantially parallel to the road surface, resolution is lowered for distant places, as shown in FIGS. 2(a) and 2(b). FIG. 2(a) is an input image from the camera. FIG. 2(b) is the input image converted to an image where the road surface is viewed from right above. On an image 200 of FIG. 2(a), plural straight lines 201 to 208 which extend in lateral direction and are arranged vertically evenly are drawn and points of intersection with white lines 221, 222 on the image are denoted by "+" symbols. The straight lines 201 to 208 in FIG. 2(a) correspond to straight lines 211 to 218 in FIG. 2(b).

It can be seen that while the + symbols are situated at equal distances in vertical direction on the image are, the distance between + symbols in the actual three-dimensional space becomes longer for symbols farther away from the own vehicle as shown in FIG. 2(b) and therefore resolution is lower at long distances.

Thus, the image generating unit 20 carries out processing to increase the resolution of a distant area 501 that is a partial area of the image, as shown in FIGS. 5(a) and 5(b), so that a sufficient resolution can be obtained even in the distant area 501. In FIG. 5(a), a distance (standard distance) L in front of the vehicle on an image 500 is defined and processing to increase image resolution is carried out to the area 501 that is more distant than the distance L, thus newly generating a high-definition image.

In this embodiment, an area 504 nearer to the vehicle than the distance L has a normal resolution that is equivalent to the resolution of the video inputs from the cameras 12, 13, and the distant area 501 has a higher resolution than the inputted video. FIG. 5(b) is an enlarged view of a preceding car area 502 of FIG. 5(a). A matching block 503 is assumed to have the template size that operates with the normal resolution, as explained in FIGS. 3(a) and 3(b) and 4(a) and 4(b).

Figure 4:
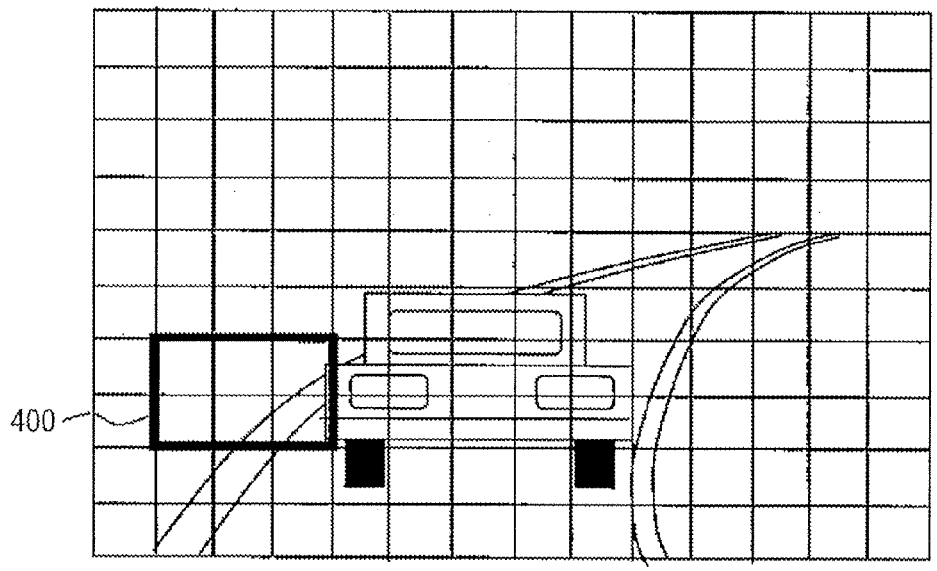
FIGS. 4(a) and 4(b) are views illustrating a second known example.
Figure 4:
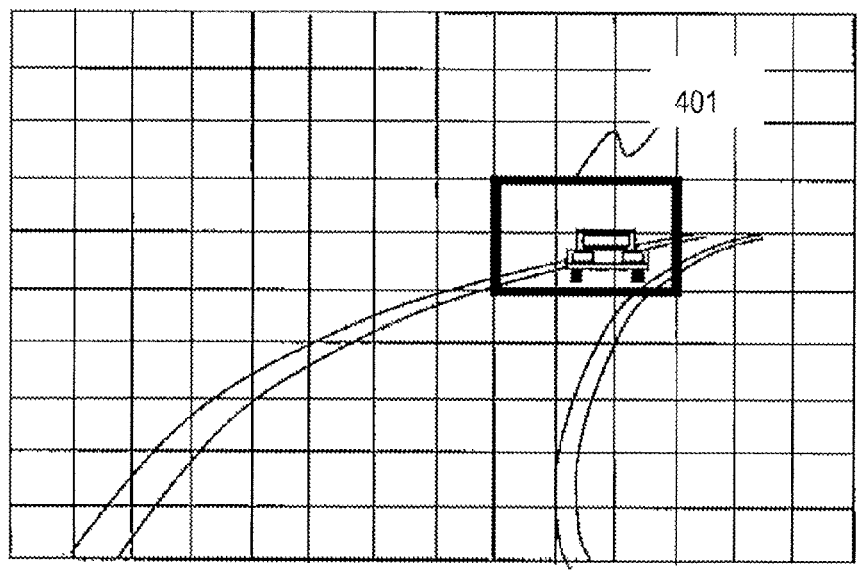

At this time, if the size of the template 401 is not changed from the size shown in FIG. 4(a), an object such as a preceding car appears small in the distant area, as shown in FIG. 4(b), and many external disturbances such as background portions are included in the matching block 401. Therefore, conventionally, when such a matching block 401 is used, the correlation value of an object in a distant place cannot be calculated accurately, and consequently, accurate distance information cannot be found.

On the contrary, the stereo camera apparatus 1 of this embodiment changes the resolution of the distant area 501 to increase resolution, as shown in FIG. 5(a). Therefore, the correlation value of an object can be found accurately without changing the image size of the matching block 503, and consequently, distance measuring is highly accurate.

In the case where a preceding vehicle is detected and the distance to the preceding vehicle is measured, the detection of the preceding vehicle is executed by carrying out recognition processing to a distance image (an image in which pixel values represent distance information) obtained by the processing by the distance calculating unit 30 and a gray-scale image. For example, when the preceding vehicle has only a small area as shown in FIG. 4(b), a good result cannot be obtained even if vehicle detection is carried out using a gray-scale image.

To determine a vehicle based on a gray-scale image, an enough resolution to perceive wheels, window frames, stop lamps and the like, which are features of the vehicle, is necessary. In terms of image size, the number of pixels equal to or greater than 10 vertical pixels×20 horizontal pixels is required.

When a known vehicle detecting method is used, normally, there are resolutions of an image (the number of pixels in which an object is included) suitable for various methods, and by employing a corresponding resolution, improvement in performance is possible. Since the size of the preceding vehicle on the image is inversely proportional to the distance, measuring performance can be improved by adjusting the resolution by the image generating unit 20 according to the distance of the preceding vehicle. In this case, as an indicator to decide the resolution, for example, controlling the number of pixels that include the preceding vehicle to 200 to 300 pixels, or the like can be considered.

According to the invention, by increasing the resolution of the distant area 501, stability of calculation of correlation value for a long distance and improvement in distance resolution can be realized simultaneously, without changing the size of the matching block. Also, when distance calculation is carried out using a high-definition image of this high-resolution area 501, since the resolution is different from a normal area, disparity information obtained by matching is converted to the number of pixels for the normal resolution and distance calculation is thus carried out.

Figure 5:
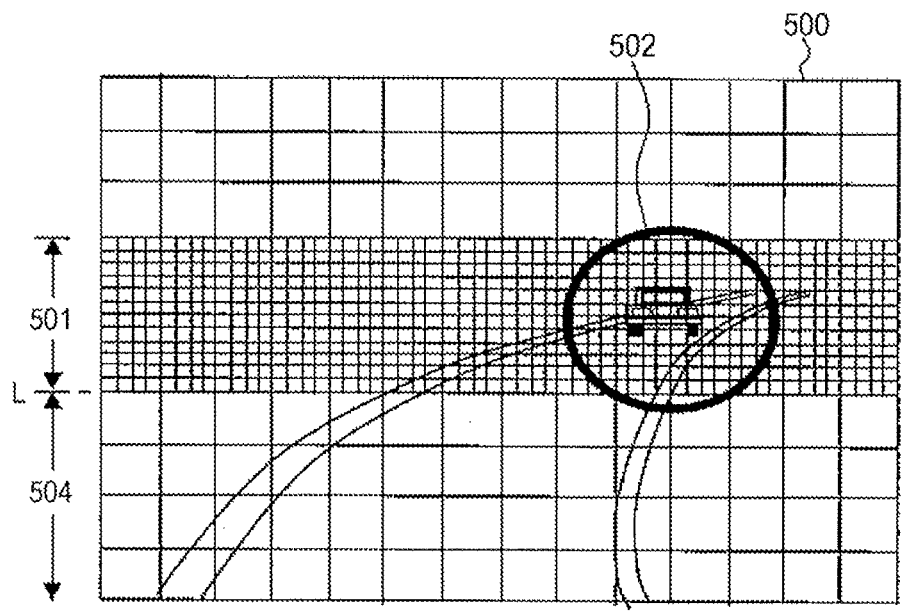
FIGS. 5(a) and 5(b) are views illustrating a principal ideas of the invention.
Figure 5:
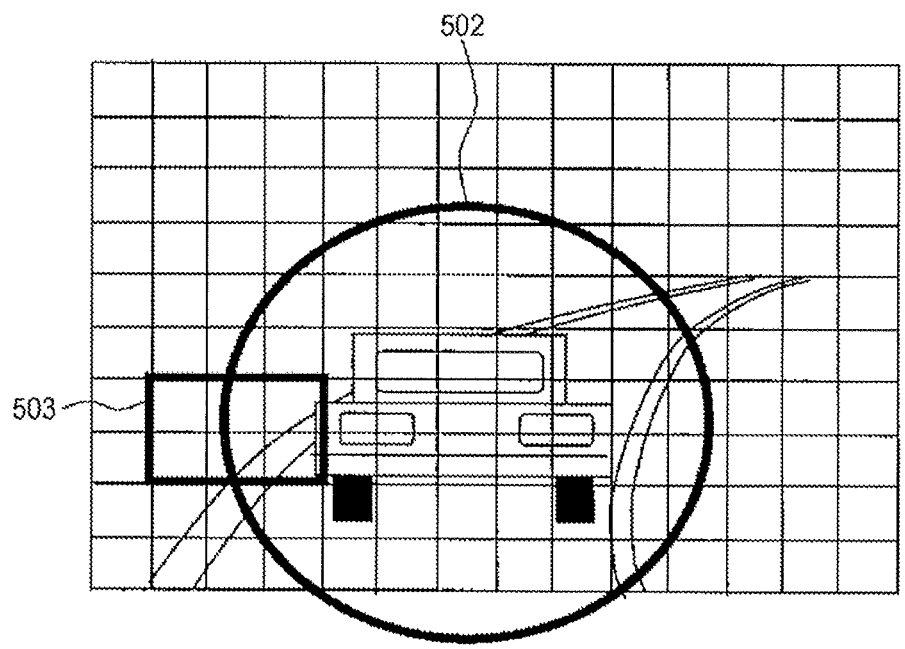
Figure 6:
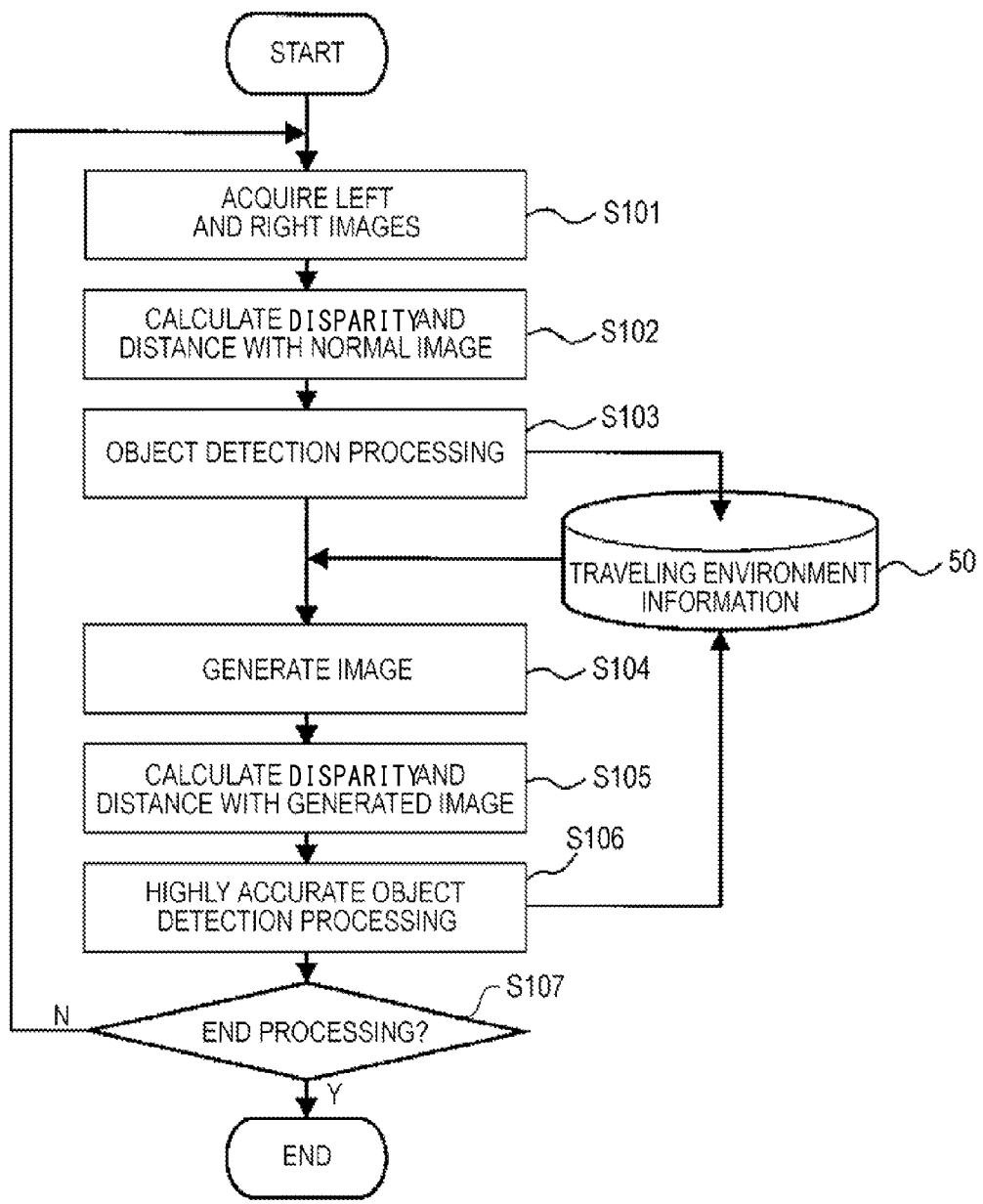
FIG. 6 is a view showing an example of processing carried out in the stereo camera apparatus.
Figure 7:
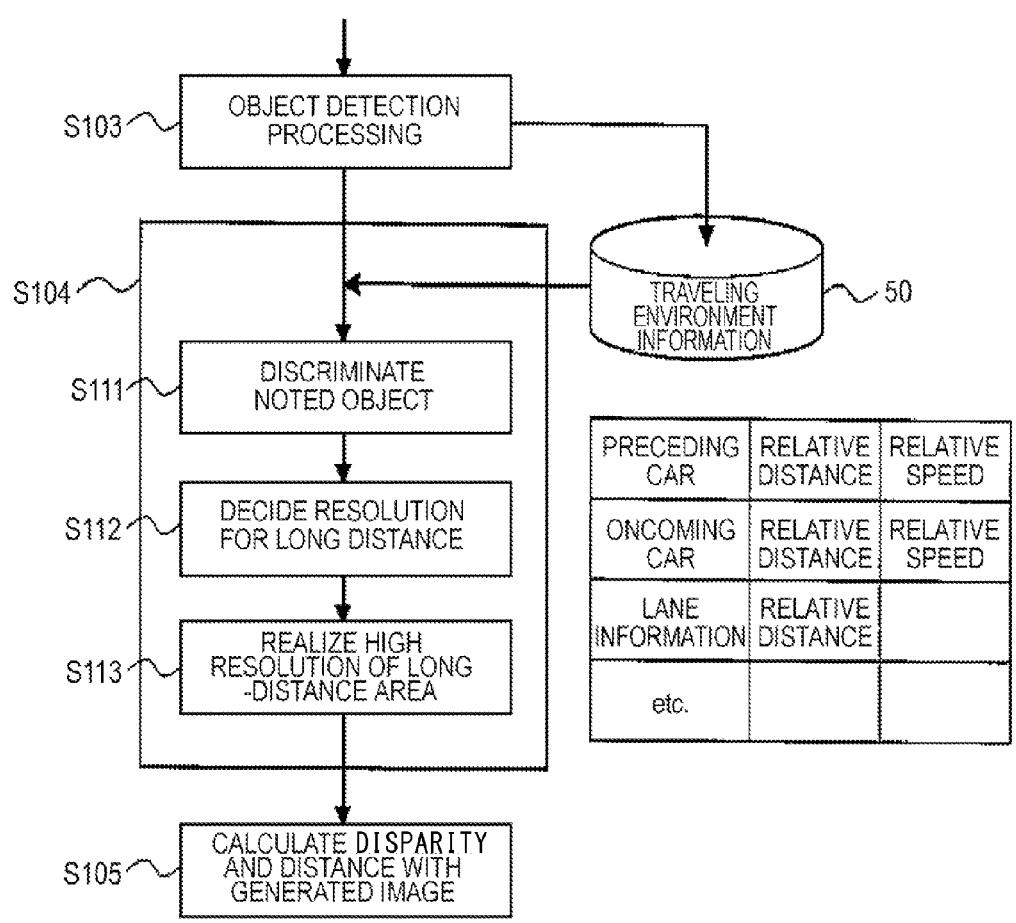
FIG. 7 is a view illustrating details of image generation processing.

Next, using FIGS. 6 and 7, an example of a method for realizing the idea explained in FIGS. 5(*a*) and 5(*b*) will be described. FIG. 6 is a view showing an example of processing carried out in the stereo camera apparatus.

As shown in FIG. 6, with the start of the processing, first, left and right image acquisition processing S101 is carried out and each image picked up by the left and right cameras 12, 13 is acquired respectively by the left image acquiring unit 10 and the right image acquiring unit 11. As the next step, processing S102 to calculate disparity using a normal image and calculate a distance is carried out.

After that, object detection processing S103 is carried out based on distance information obtained by the processing S102, and the result of the detection is recorded as traveling environment information in the traveling environment information storage unit 50. As the traveling environment information, relative positions and relative speeds of three-dimensional objects on the road such as preceding cars, oncoming cars, pedestrians and motorcycles are recorded. Moreover, driving lane information, relative position information of structures on the road such as crash barriers and utility poles, own car position information obtained from the GPS (global positioning system) or car navigation system, and map information inputted in advance in the car navigation system or the like, are included. These pieces of traveling environment information are updated every time the object detection processing S103 is carried out.

In image generation processing S104, specifications of an image to be generated are decided using the traveling environment information in the traveling environment information storage unit 50, and image generation is carried out. In the image generation processing S104, resolution is decided, specifically targeting a certain object. In this case, the traveling environment information is used to decide which object should be targeted. For example, targeting an object with the highest probability of collision, based on the traveling environment information, can be given as an example.

The probability of collision can be calculated from the speed, traveling direction or the like of the own vehicle and the object. Also, if the traveling speed of the own vehicle is slow, image generation can be carried out by more complex processing.

For example, if the traveling speed of the own vehicle is slow and therefore changes on the image are very small, it is possible to find a motion vector of an image in a small area, used in image compression technique or the like, and create midway data by interpolation, or the like. Also, applying a super resolution technique, which is a technique for raising the resolution above the actual resolution, an image with higher definition than with interpolation processing can be created. The super resolution processing normally takes a long processing time and therefore is unsuitable processing for real time. However, since this can be applied on the assumption that the moving speed of the own vehicle is slow, better image generation processing becomes possible by utilizing the traveling environment information. By the way, the techniques such as super resolution processing are described, for example, in JP-A-2010-21730.

Next, detailed processing contents in the image generation processing S104 will be described using FIG. 7. FIG. 7 is a view illustrating the contents of the image generation processing in detail.

As the object detection processing S103 ends, the image generating unit 20 decides an object which the own vehicle should note most, from objects, referring to the traveling environment information in the traveling environment information storage unit 50. Here, a vehicle with the risk of collision is noted and noted object discrimination processing S111 is executed. As the noted object is extracted from the objects, processing S112 to decide the resolution of a long-distance area based on the distance from the own vehicle to the noted object is carried out.

Then, as the resolution of the long-distance area is decided by the processing S112, processing S113 to increase resolution for the long-distance area accordingly is carried out. As a high-resolution image is generated in the long-distance area, the processing S105 to calculate disparity and to calculate the distance is executed again, using this image. Based on the result thereof, highly accurate object detection processing S106 is executed. The result of processing here is fed back again to the traveling environment information storage unit 50 as traveling environment information and is changed to the latest information. The disparity and distance calculation processing S105 in this case is executed according to the processing flow explained in FIG. 16 and FIGS. 17(*a*) and 17(*b*).

Figure 8:
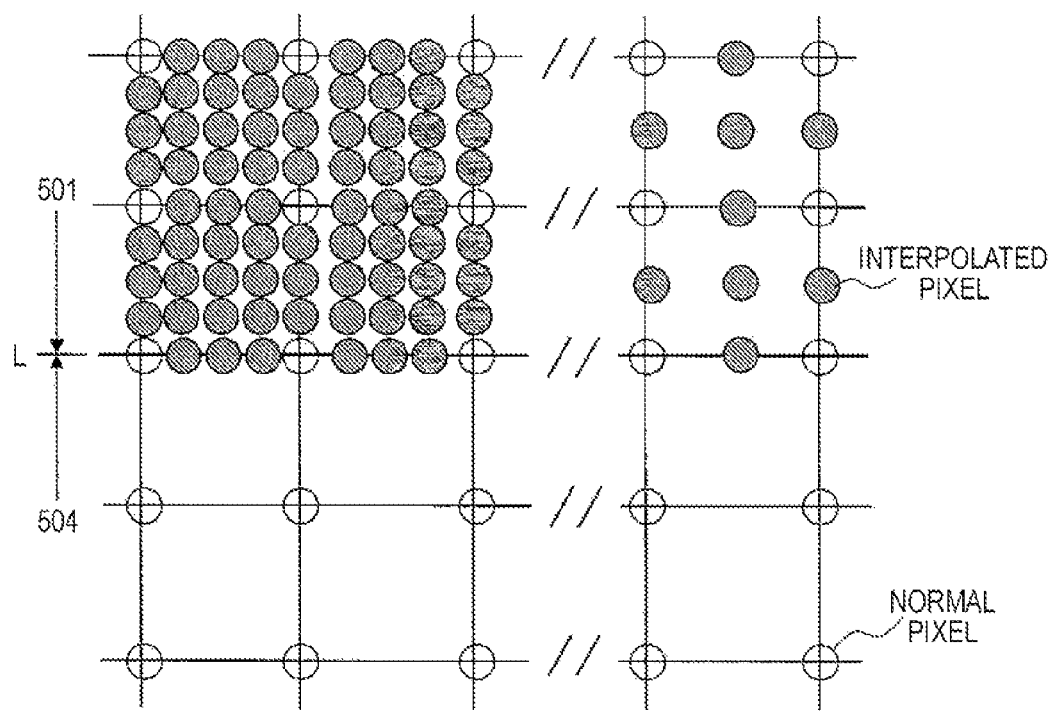
FIG. 8 is a view illustrating interpolation processing for the purpose of realizing high definition.

FIG. 8 is a view illustrating a method for increasing the resolution of an image. The high-resolution area 501 of FIG. 5(*a*) has a resolution quadruple of the resolution of the normal resolution area 504 both vertically and horizontally. FIG. 8 shows a conceptual view of vertically and horizontally quadruple and double resolutions, as an example. The "◯" (white circle) shown in FIG. 8 is a pixel (normal pixel) that exists with normal resolution. Using this normal pixel, an interpolated pixel "●" (black circle) is generated.

As methods for generating this interpolated pixel, there are various known methods, including bi-linear interpolation, which is linear interpolation, spline interpolation, polynomial interpolation and the like. Super resolution techniques in which a high-order polynomial or an object model is defined require much computational complexity and therefore are inconvenient. However, resolution can be increased by saving or highlighting features of an image. Therefore, the techniques need to be used properly depending on the application. According to the invention, by increasing the resolution of the image itself that is used for processing, a correlation value calculation stabilizing effect and a measuring resolution improving effect are achieved.

Figure 9:
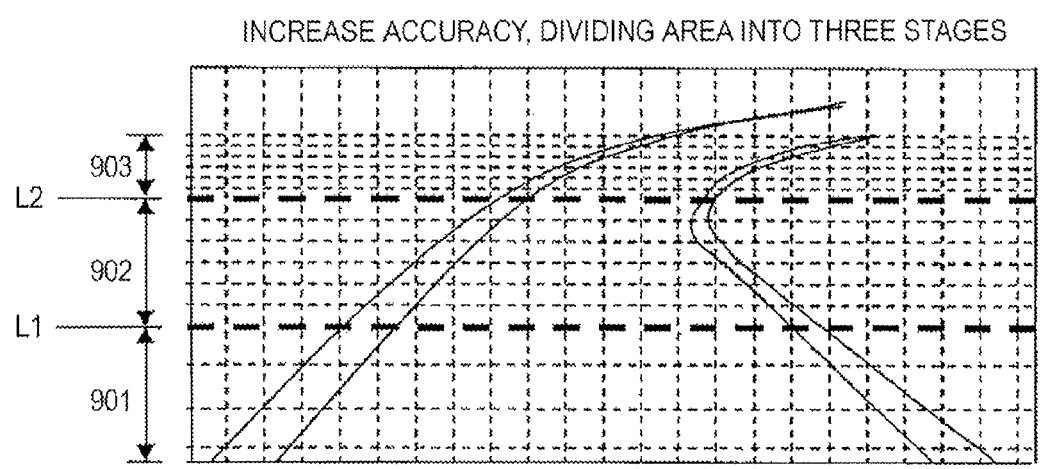
FIGS. 9(a) and 9(b) are views illustrating a method for realizing high definition of an image.
Figure 9:
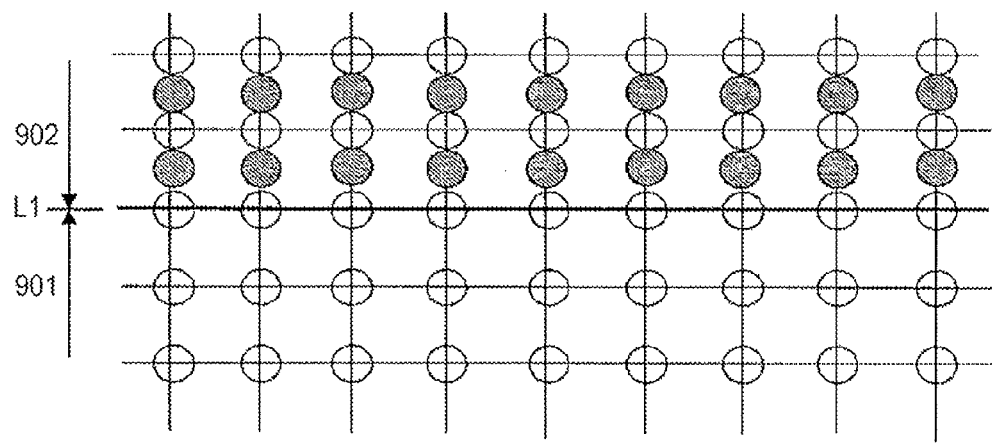

Another example related to the increase in resolution will be described using FIGS. 9(*a*) and 9(*b*). In FIGS. 9(*a*) and 9(*b*), an area where image resolution is changed is divided into three areas 901 to 903. The three division areas 901 to 903 are defined in the long-distance resolution decision processing S112 of FIG. 7. Here, division processing is carried out using two parameters that are distances from the own vehicle (first standard distance and second standard distance) L1, L2. The image generating unit 20 regards areas that are horizontally divided in each image, using the distance L from the vehicle as a parameter, as partial areas 901 to 903 of the each image.

Also, in the embodiment of FIGS. 9(*a*) and 9(*b*), only the resolution in vertical direction is improved without increasing the resolution in horizontal direction. An example of interpolation in this case is shown in FIG. 9(*b*). As an interpolation method in this case, other than the foregoing interpolation technique, there is a method using field information that is not used for processing, if interlacing system (a video format where one frame includes two fields of odd and even numbers) is employed.

Figure 10:
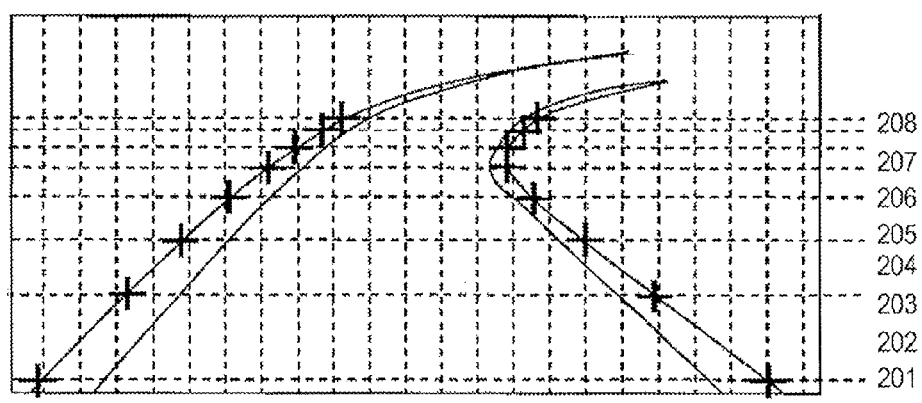
FIGS. 10(a) and 10(b) are views illustrating another method for realizing high definition of an image.
Figure 10:
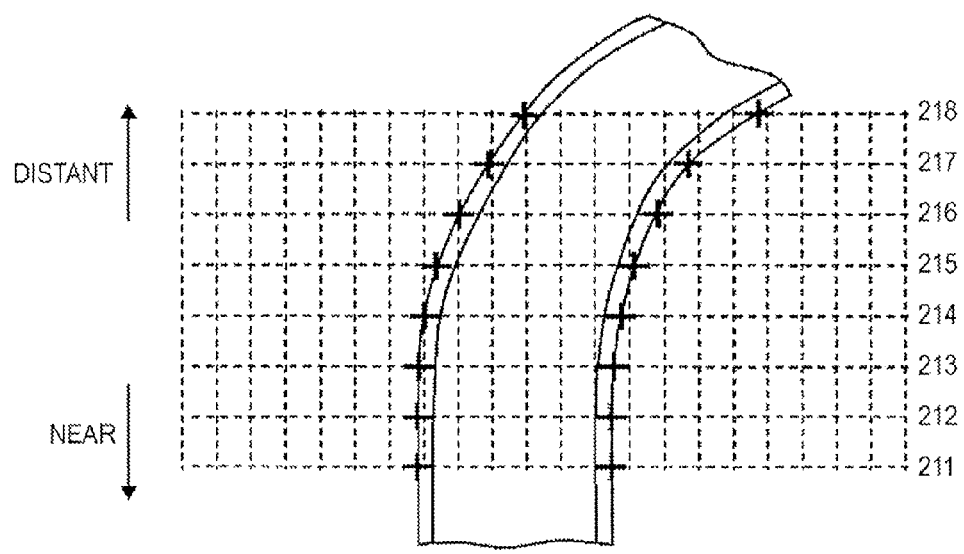

Another example related to the increase in resolution will be described using FIGS. 10(a) and 10(b). While image resolution is divided into three stages in FIGS. 9(a) and 9(b), multiple stages are used in FIG. 10(a). With multiple stages, sufficient distance measuring resolution, as viewed from above the road surface, is secured even in distant places and the resolution is equal, as shown in FIG. 10(b). Such setting of distance measuring resolution is advantageous in that estimation accuracy is improved further in curve estimation or the like. In the case of the conventional setting of FIG. 2(b), since there is no result of measuring for distant places when estimating a curve in front, a delay or error tends to occur in estimating the shape of the curve. By arranging measuring points evenly as shown in FIG. 10(b), it is possible to improve performance of road shape estimation including curve shape estimation.

Figure 11:
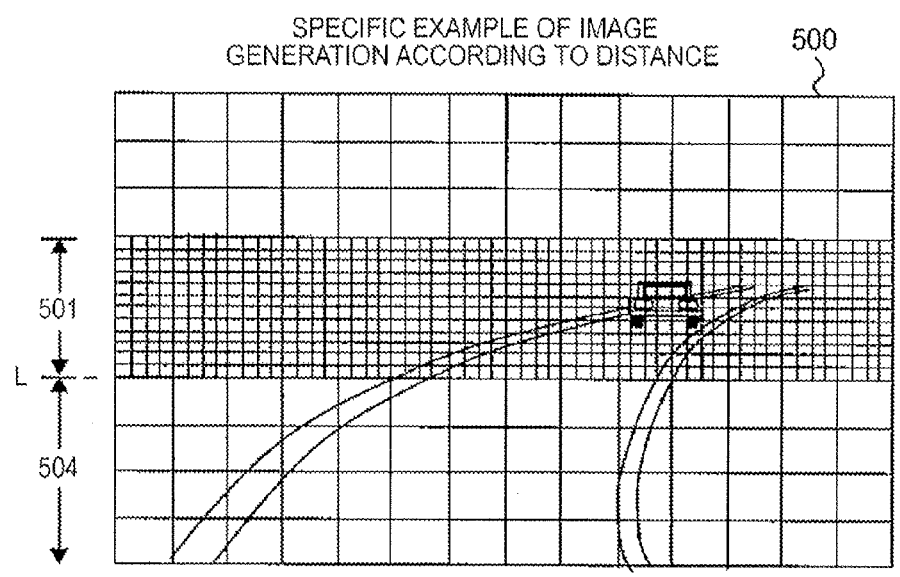
FIGS. 11(a) and 11(b) are views illustrating an example where resolution is changed according to the distance to an object.
Figure 11:
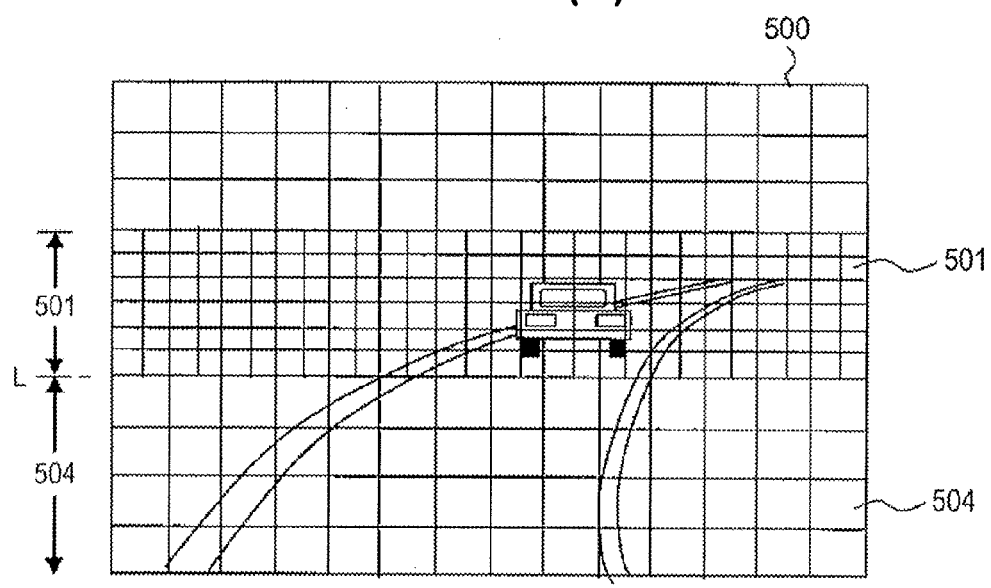

Next, the difference in the setting of image resolution according to the distance to an object is shown in FIGS. 11(a) and 11(b). In FIG. 11(a), as objects to the measured, two things, that is, white lines on the road and a preceding vehicle, are imaged and the preceding vehicle is selected as a noted object.

In FIG. 11(a), since the noted object is situated at a long distance from the own vehicle, the resolution of an image 501 is set to be high, creating a high-definition image. Meanwhile, in FIG. 11(b), since the noted object is situated at a mid distance, the resolution of the image 501 is slightly restrained, creating a mid-definition image. Then, the case where the noted object is situated at a short distance is dealt with normal resolution and increase in resolution is not carried out, as shown in FIG. 4(a).

Figures 12, 13:
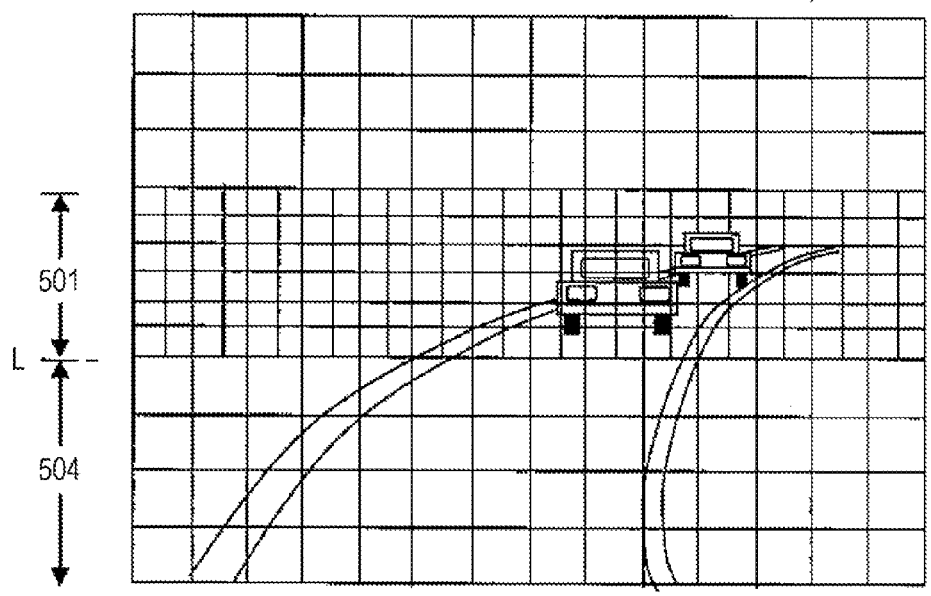
FIG. 12 is a view illustrating a processing content in the case where plural objects exist.
FIG. 13 is a view illustrating a setting example of a table for determining an order of priority.

An embodiment to cope with the case where plural noted objects exist is shown in FIG. 12. When there are plural noted objects, resolution is set according to the degree of importance of the application that is using the result of distance measuring. If the application is a following distance keeping system, following a preceding vehicle is important. Therefore, a preceding car in the driving lane where the own car is traveling is a noted object and resolution is decided accordingly.

FIG. 12 shows an embodiment where, when there are plural preceding vehicles, the backmost preceding car is taken as a noted object. This embodiment is an example, and in practice it can be considered that any object at risk of collision other than the preceding car is taken as a noted objected, as in a collision mitigation brake system or the like. When the result of distance measuring is used for vehicle control, the relative speed to the object is important and the invention, which performs distance measuring with higher accuracy from more distant places, is effective.

Also, while the case of the following distance keeping system is described here, if another system is operating, the order of priority on the object changes according to the system that is operating at the time.

FIG. 13 is a view showing an example of a priority order determination table. The order of priority on the object changes according to the system that is operating. For example, in the following distance keeping system, the preceding vehicle is given top priority. However, in a collision warning system or collision mitigation control system, the oncoming car, which has a higher relative speed, is given top priority. Meanwhile, in the case of a speed limit control system, it is necessary to recognize a traffic sign of speed limit as soon as possible and prepare for deceleration and therefore the traffic sign is given top priority.

In this way, other than giving an order of priority based on collision safety alone, as the order of priority changes according to the operating status of the system or the like and optimum image generation control is carried out accordingly, sensing capability can be enhanced.

Figure 14:
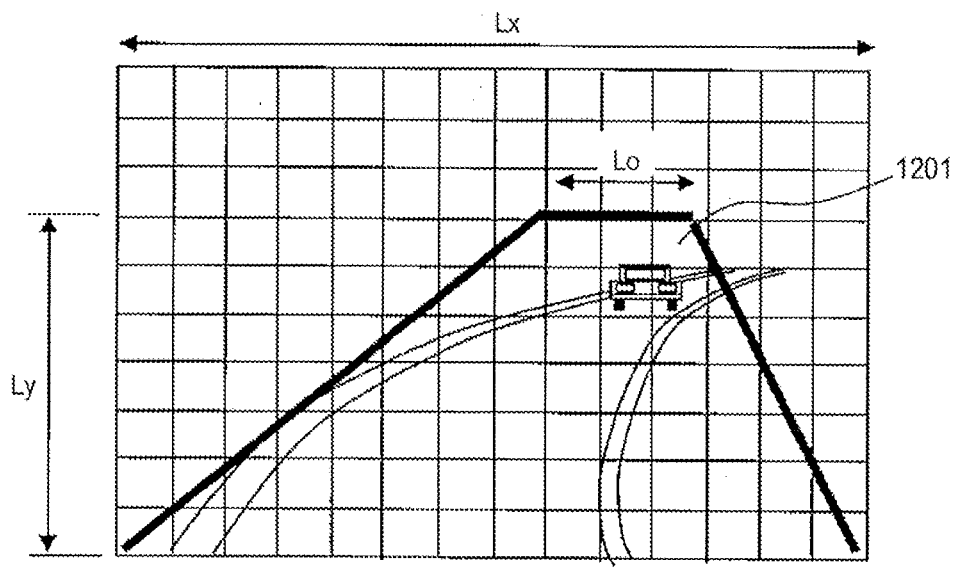
FIGS. 14(a) and 14(b) are views illustrating a method for increasing resolution without changing image size.
Figure 14:
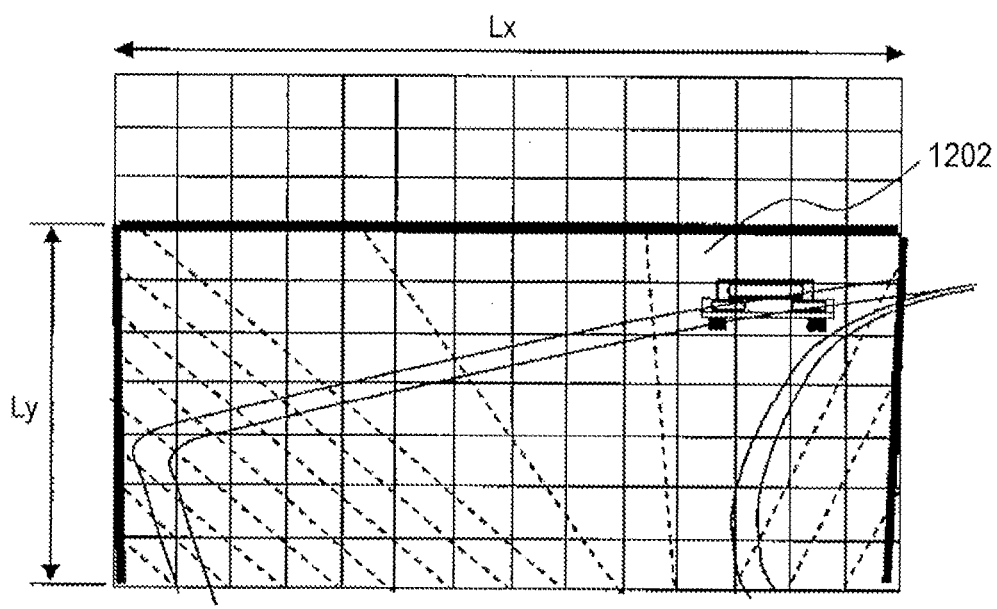

Another example related to the increase in resolution will be described using FIGS. 14(a) and 14(b). The example of FIGS. 14(a) and 14(b) illustrates a form of system where resolution is raised without changing the image size. The image generating unit 20 performs processing to deform a trapezoidal area 1201 indicated by bold solid lines shown in FIG. 14(a) to a rectangular area 1202 shown in FIG. 14(b). As a result of performing this processing, the enlargement ratio increases in long-distance areas and the same effect as increasing resolution is achieved. Also, this method has such an effect that the processing speed is constant irrespective of the resolution of the object and the high-resolution area 501, since the pixel size (Lx×Ly) after conversion is constant.

By changing the length $L_0$ of the upper side of the trapezoidal area 1201 or changing the position of the upper side according to the position of the object, changes in the environment can be followed. The fact that the processing time is constant is an important matter to the control system. Conversion carried out in such a way that the processing load is constant as shown in FIGS. 14(a) and 14(b) is one of effective features of the invention. Dotted lines in FIG. 14(b) indicate the grid of pixels of FIG. 14(a). It can be seen that the image after conversion shown in FIG. 14(b) is the result of deforming the image before conversion shown in FIG. 14(a), into a sectorial shape.

Figure 15:
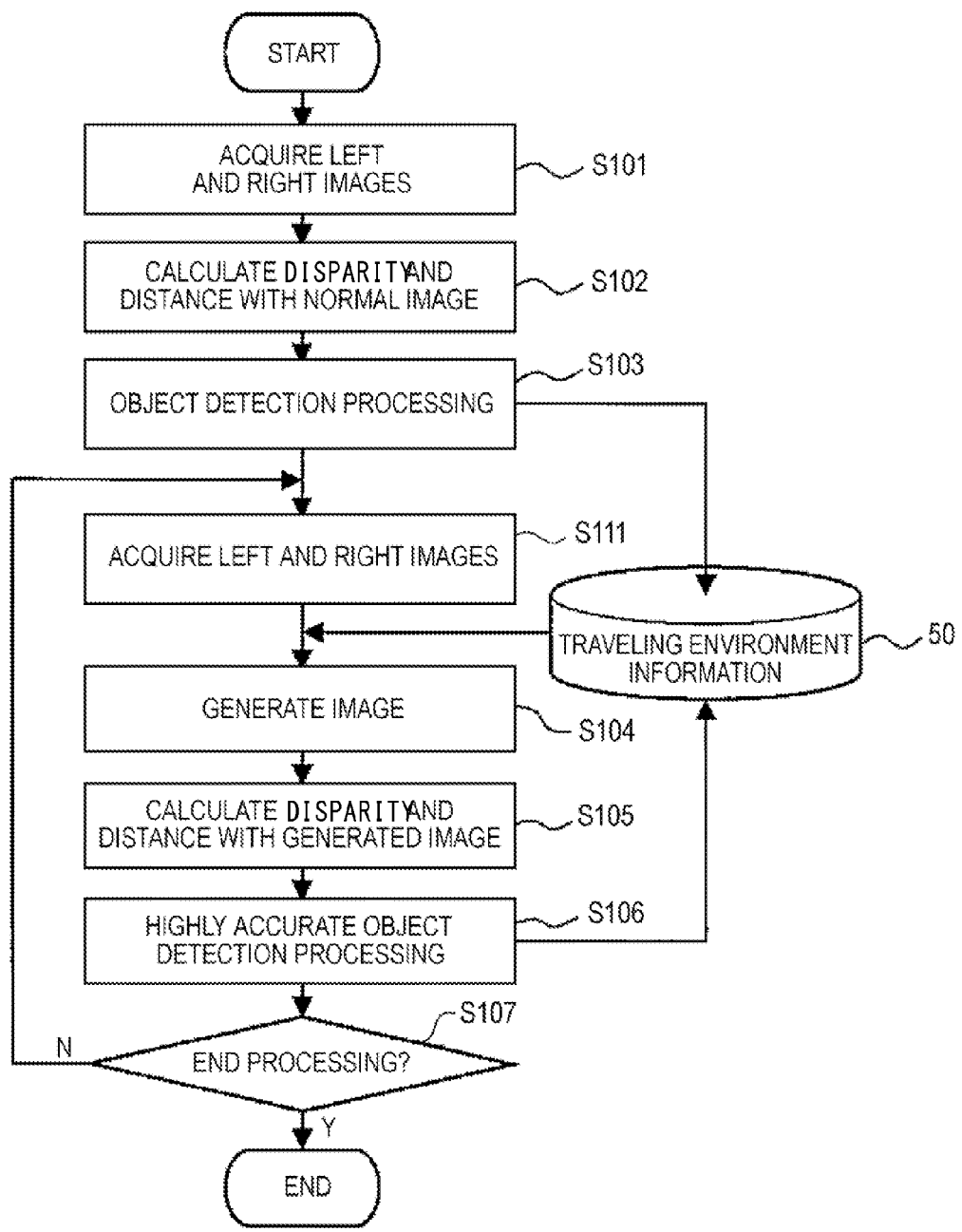
FIG. 15 is a view showing another example of the processing carried out in the first embodiment.

Next, another example will be described using FIG. 15. In FIG. 6, the disparity and distance calculation processing S102 is executed using a normal image every time left and right images are acquired with the left and right cameras 12, 13. However, in the processing flow shown in FIG. 15, the disparity and distance calculation processing S102 is carried out using a normal image only when the first system is executed. In the subsequent repetitive processing, the left and right image acquisition S111 is inserted midway and image generation processing is carried out using the previous traveling environment information 50. According to the processing method shown in FIG. 15, the need to carry out the disparity and distance calculation processing S102 with a normal image of each time can be eliminated, and immediately after image acquisition, the processing can shift to the image generation S104 and image generation can be carried out.

According to the stereo camera apparatus 1 having the above configuration, by increasing resolution in a partial area of an image, stability of the calculation of correlation value for long distances and improvement in distance resolution can be realized simultaneously without changing the size of matching blocks, and the distance from the own vehicle to the object can be calculated accurately. Therefore, an application which utilizes information of the distance from the own vehicle to the object can use more accurate distance information and precise and highly accurate processing can be carried out.

Second Embodiment

In the above first embodiment, the stereo camera apparatus capable of highly accurate and stable distance measuring even with low-resolution cameras is described on the assumption that an input image does not have a sufficient resolution for long-distance measuring. However, in this embodiment, the case where an input image has a sufficient resolution for long-distance measuring will be described.

Figure 18:
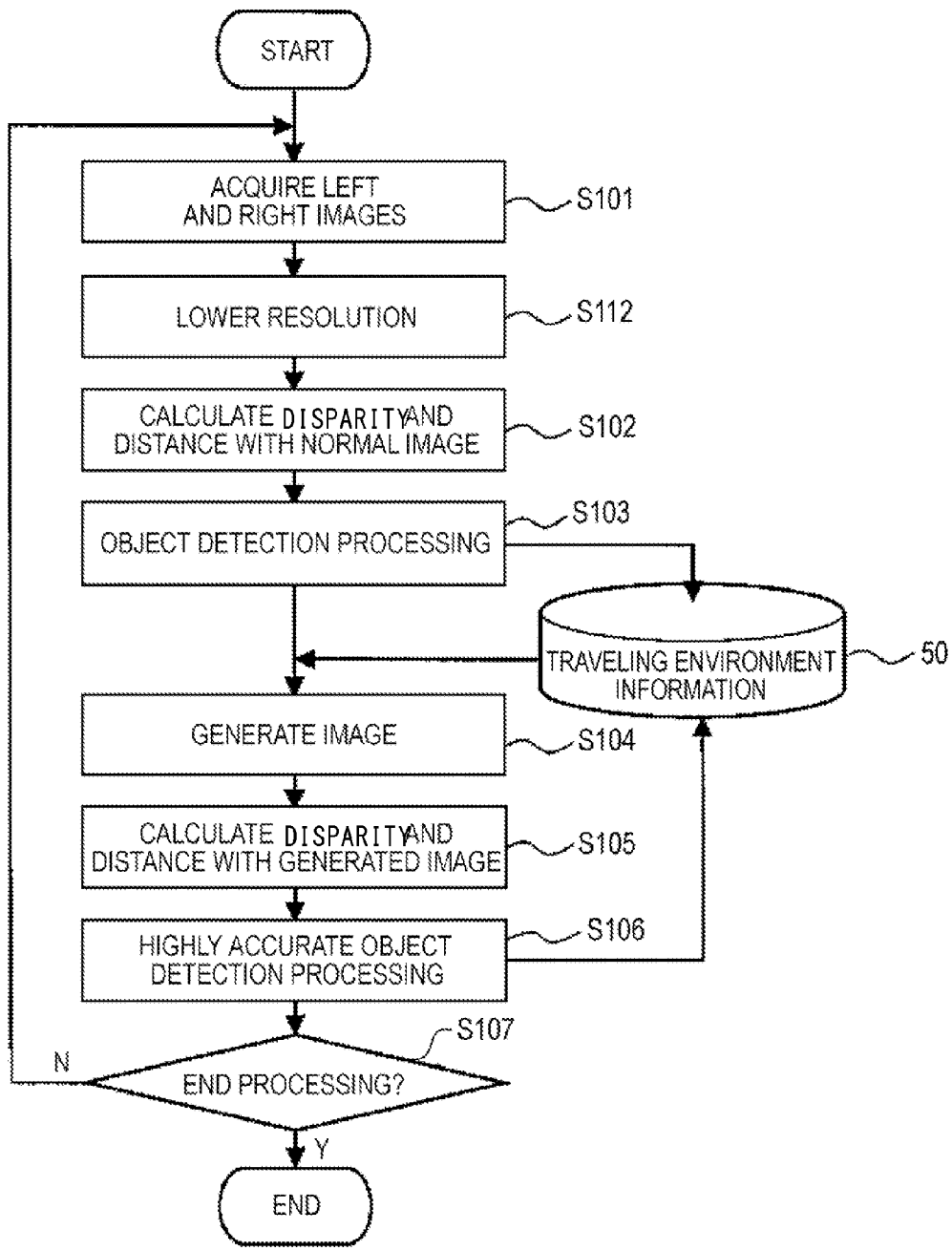
FIG. 18 is a view illustrating a content of processing in a second embodiment.

In the case where the left and right cameras 12, 13 are image pickup elements (high-definition cameras) capable of picking up an image with high resolution, in the processing flow of FIG. 18, the resolution lowering processing S112 is inserted after the high-resolution left and right image acquisition S101 and high-resolution images are converted to normal images. Here, a high resolution image refers to an image having a resolution with which sufficient distance accuracy can be calculated even in a long-distance area. A normal image refers to an image size with which the stereo camera apparatus 1 can calculate distance information within a processing time required of the system.

With the recent increase in resolution of image pickup devices, an image pickup device that takes in a high-definition image (high-resolution image) can also be installed in the stereo camera apparatus 1. However, in the case of a high-resolution image, since resolution is unnecessarily high for short distances, reducing the resolution is effective in view of processing time and memory capacity. According to the invention, it is possible to convert a high-resolution image that is taken in into a low-resolution image and execute the subsequent processing. Both high-speed processing and high accuracy can be achieved.

Figure 19:
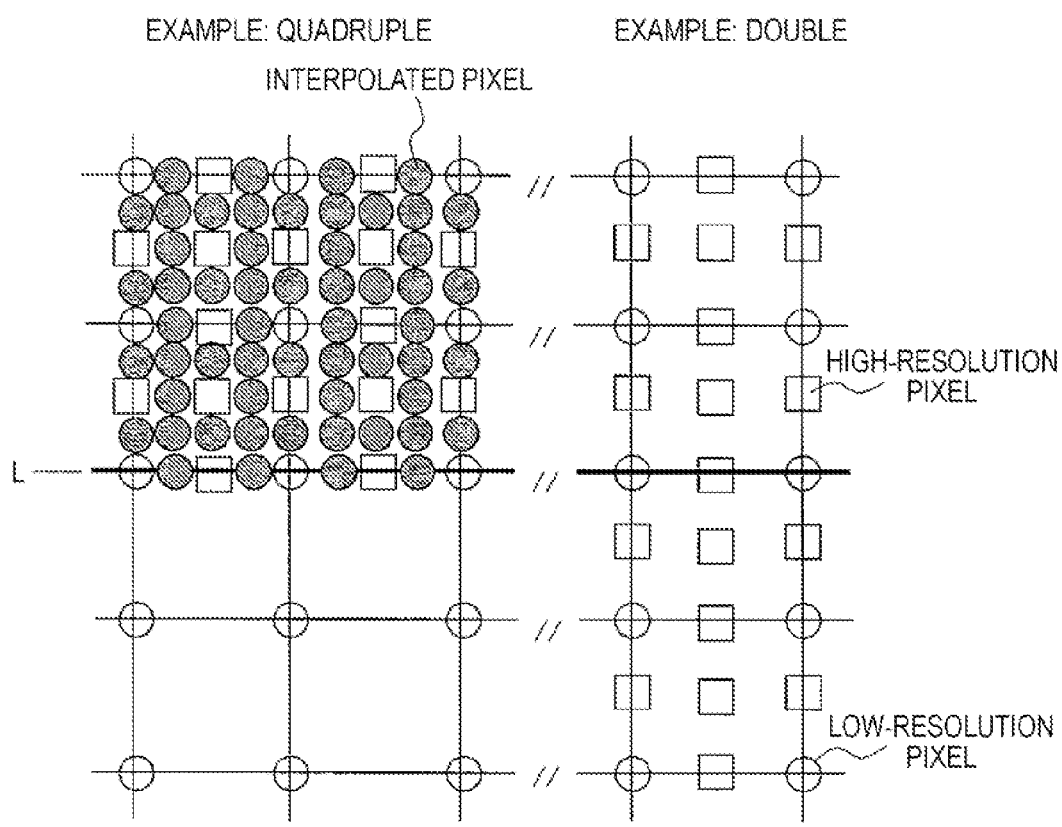

FIG. 19 illustrates the use of pixels when increasing resolution. In this embodiment, there are pixel data with the resolution increased already at the time of input. In the example of FIG. 19, a white circle "○" with normal resolution is described as a low-resolution pixel in an inputted image, and a pixel of a white quadrilateral (□) that is not used when low resolution is used is denoted as a high-resolution pixel.

The case of double resolution can be dealt with by restoring high-resolution pixels thinned out by the resolution lowering, that is, the original pixel data of a high-definition image inputted from the high-definition camera.

Moreover, in the case of quadruple resolution, by carrying out interpolation processing using a high-definition image inputted from the high-definition camera, an image with quadruple resolution can be created. The black circle (●) refers to a pixel generated by the interpolation processing.

Next, detailed processing contents in this embodiment will be described using FIGS. 20(a), 20(b), 21(a), and 21(b). For example, as shown in FIGS. 4(a) and 4(b) and FIGS. 11(a) and 11(b), in the image 500, the object appears smaller as the object is farther away from the own vehicle, and the object appears larger as the object is closer to the own vehicle.

Here, when the distance from the own vehicle to the object is shorter than a preset first standard distance, the distance from the vehicle to the object is calculated based on disparity of a partial area of each image where resolution is changed by the image generating unit. When the distance from the vehicle to the object is longer than a preset second standard distance, the distance from the vehicle to the object is calculated based on disparity of each image taken in by the image capture unit.

Figure 20:
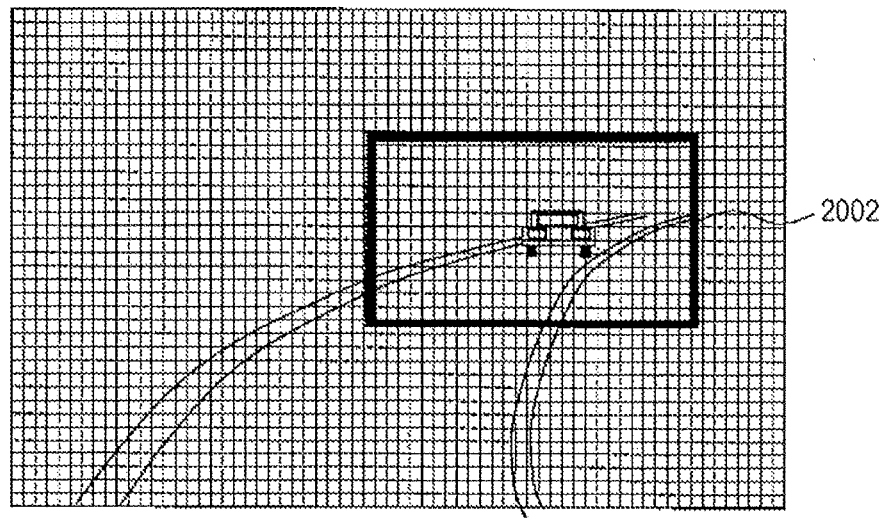
FIGS. 20(a) and 20(b) are views illustrating the content of the processing carried out in the second embodiment.
Figure 20:
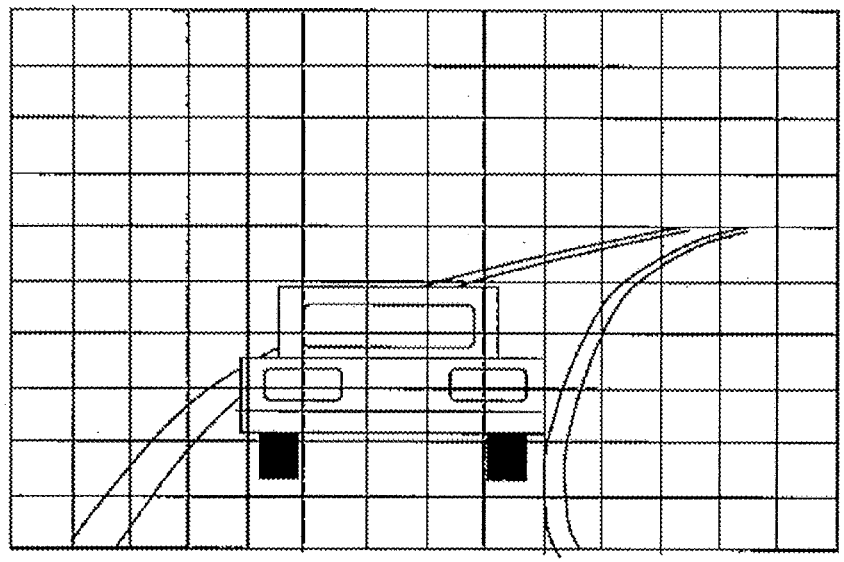

As shown in FIG. 20(a), in the case where the object exists is a distant place from the own vehicle, a partial area 2002 of a high-resolution image 2000 of FIG. 20(a) is sliced out, as shown in an image 2001 used for processing in FIG. 20(b), and processing is carried out using the number of pixels with which sufficient resolution can be obtained on the object. At this time, resolution is not lowered in the high-resolution image 2000 and the partial area 2002 including the object is sliced out and used with the existing resolution. By thus slicing out the partial area 2002, the image can be handled similarly to a normal-resolution image in terms of the number of pixels processed.

Figure 21:
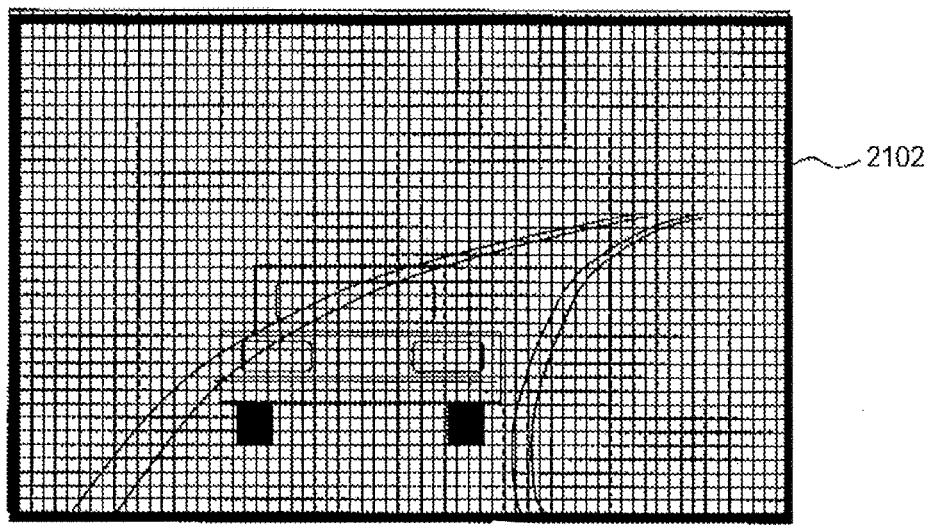
FIGS. 21(a) and 21(b) are views illustrating the content of the processing carried out in the second embodiment.
Figure 21:
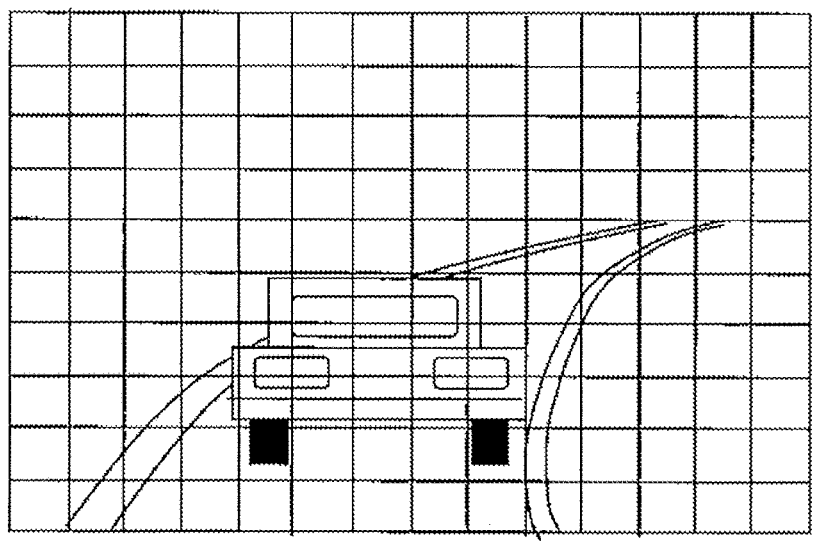

Meanwhile, in the case where the object is close to the own car, as shown in FIG. 21(a) and FIG. 21(b), respectively, pixels of a high-resolution image 2100 are thinned out and a low-resolution image 2101 in which resolution is lowered is generated. In generating the low-resolution image, pixels of the high-resolution image may be simply thinned out to generate the low-resolution image, or data of thinned-out pixels are summed to generate the low-resolution image.

According to this embodiment, using the high-resolution image pickup element, the resolution of an image used for processing can be changed according to the distance of the object. Therefore, efficient processing can be carried out using the high-resolution image pickup element and a stereo camera apparatus can be provided inexpensively without using a high-performance processor.

As described above, in the case where a high-resolution image is inputted to the stereo camera apparatus 1, by lowering resolution, distance measuring processing can be executed without unnecessarily using the processing time and hard resources.

In this embodiment, a high-definition image of double resolution is assumed. However, cases of higher definition such as quadruple or sextuple can be dealt with by increasing the degree of resolution reduction. Also, if the invention is applied to a control where image resolution is set in multiple stages according to the distance, with the resolution lowered for shorter distances and raised for longer distances, as shown in FIGS. 10(a) and 10(b), the invention can be utilized more effectively.

Note that the invention is not limited to each of the above embodiments and various changes can be made without departing from the scope of the invention. For example, in each of the above embodiments, it is described that one-dimensional scan in lateral direction is necessary in order to find the correlation value using the matching block in the disparity and distance calculation processing (S102).

To calculate the correlation value accurately, in the relation between the matching block in the standard image and the reference image, the resolution needs to be constantly the same and the resolution cannot be changed in lateral direction. This is one constraint of the foregoing embodiments. However, if the resolution of the matching block is adapted and conversion can be carried out at computation costs at the time of processing, the above constraint can be eliminated.

The invention claimed is:

1. A stereo camera apparatus which measures a distance to a three-dimensional object, using two images picked up by two cameras, comprising:
   an image capture unit which takes in the two images;
   an image generating processor which changes resolution of a partial area of each image taken in by the image capture unit; and
   a distance calculating processor which calculates a distance from the vehicle to a three-dimensional object that is imaged in the partial area, based on disparity of the partial area of each image in which resolution is changed by the image generating processor;
   wherein the image generating processor changes the resolution of the partial area of each image based on the distance from the vehicle to the three-dimensional object, such that a number of pixels in which the three-dimensional object is included becomes a number of pixels that is preset according to a structural type of the three-dimensional object; and wherein the image generating processor changes the resolution to a higher resolution when the distance from the vehicle to the three-dimensional object is longer than a preset first standard distance, and the image generating processor changes the resolution to the higher resolution by improving the resolution in vertical direction only, the resolution in the vertical direction being even in each partial area.

2. A stereo camera apparatus which measures a distance to a three-dimensional object, using two images picked up by two cameras, comprising:

an image capture unit which takes in the two images;

an image generating processor which changes resolution of a partial area of each image taken in by the image capture unit; and a distance calculating processor which calculates a distance from the vehicle to a three-dimensional object that is imaged in the partial area, based on disparity of the partial area of each image in which resolution is changed by the image generating processor;

wherein the image generating processor changes the resolution of the partial area of each image based on the distance from the vehicle to the three-dimensional object, such that a number of pixels in which the three-dimensional object is included becomes a number of pixels that is preset according to a structural type of the three-dimensional object;

wherein, when plural three-dimensional objects are imaged in the partial area, the image generating processor selects a three-dimensional object with top priority based on an order of priority, and decides the resolution of the partial area of each image based on the selected three-dimensional object, wherein the stereo camera apparatus further comprises a plurality of systems that utilize information of the distance, and wherein the image generating processor selects the three-dimensional object with the top priority based on the order of priority according to the system that is operating.

* * * * *